Aug. 7, 1945.    C. L. BAUMANN, JR    2,381,250
ELECTRIC ENGINE CONTROL APPARATUS
Filed May 1, 1942    3 Sheets-Sheet 1

INVENTOR
Charles Ludwig Baumann Jr
BY Kenyon & Kenyon
his ATTORNEYS

Aug. 7, 1945.   C. L. BAUMANN, JR   2,381,250
ELECTRIC ENGINE CONTROL APPARATUS
Filed May 1, 1942   3 Sheets-Sheet 2
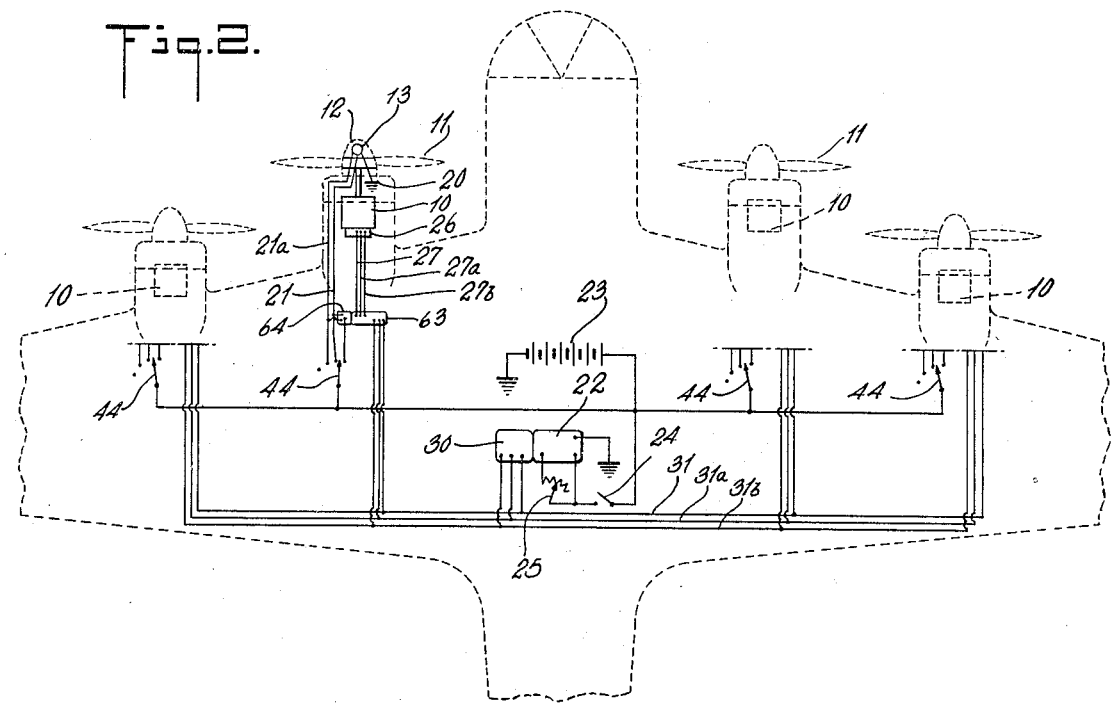
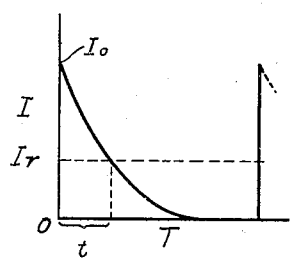
Fig.3.
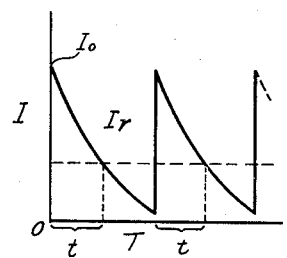
Fig.4.
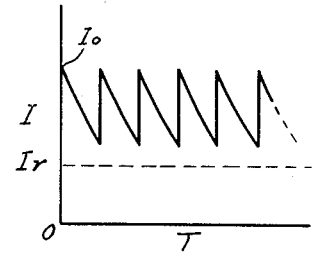
Fig.5.
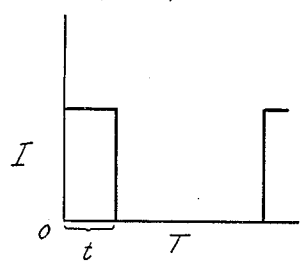
Fig.3A.
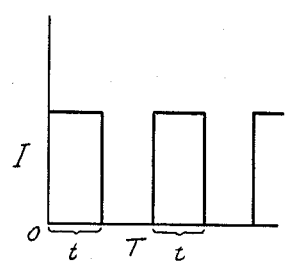
Fig.4A.
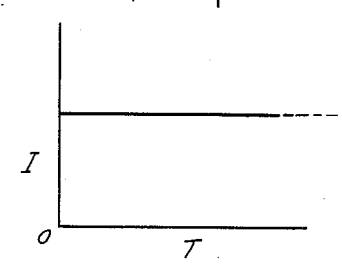
Fig.5A.
INVENTOR
Charles Ludwig Baumann Jr
BY Kenyon & Kenyon
his ATTORNEYS

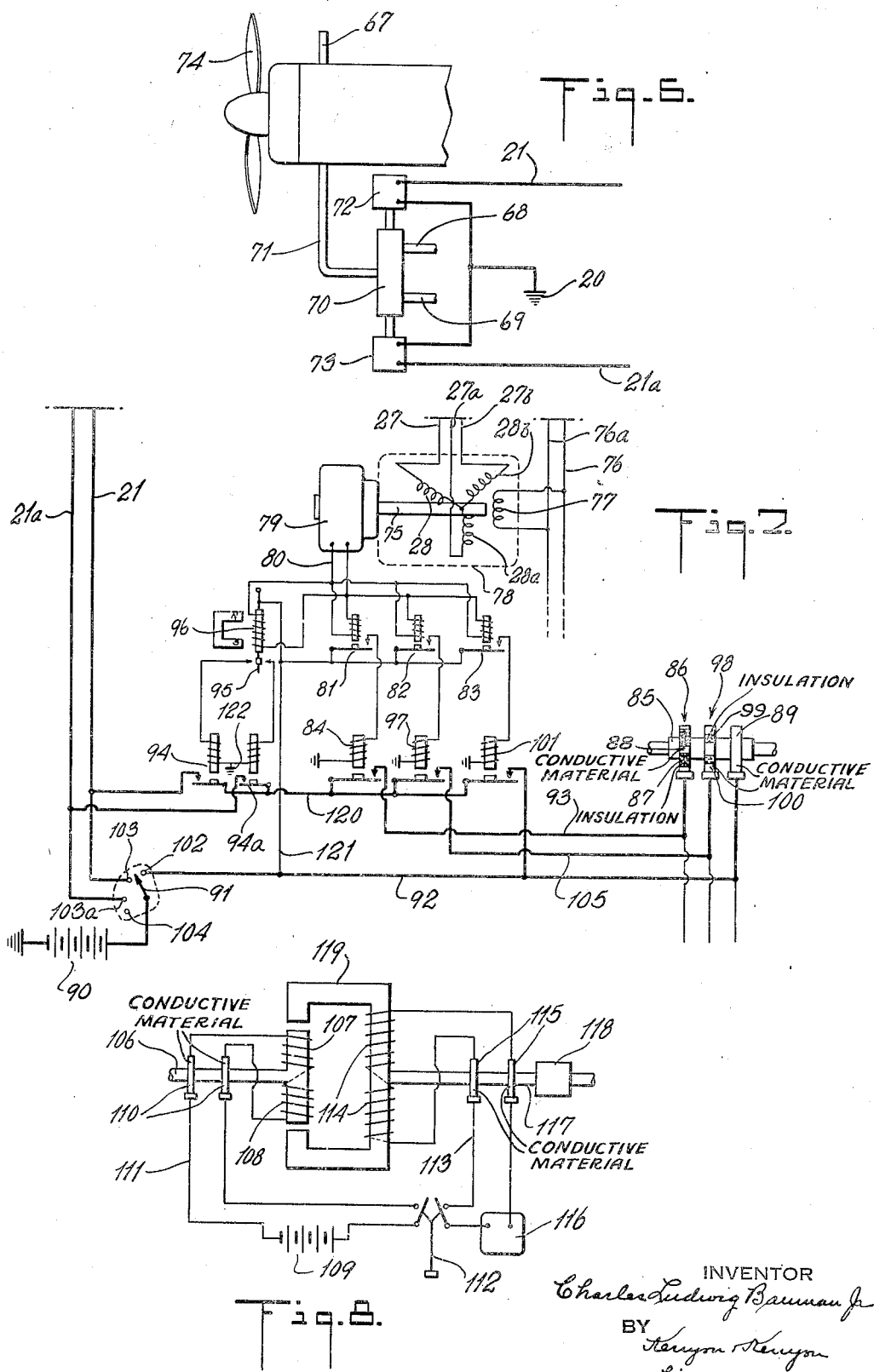

Patented Aug. 7, 1945

2,381,250

UNITED STATES PATENT OFFICE 2,381,250

ELECTRIC ENGINE CONTROL APPARATUS

Charles Ludwig Baumann, Jr., New York, N. Y.

Application May 1, 1942, Serial No. 441,385

3 Claims. (Cl. 175—355)

This invention relates to control apparatus for controlling the speed of an engine. This invention relates especially to electrical control apparatus.

It is a purpose of this invention to provide electrical control apparatus which is sensitive in response and which is proportional in its action. By stating that the control apparatus is proportional in its action it is meant that the apparatus is such that when the speed of the engine varies to a relatively great extent from the desired speed, the amount of adjustment of the speed controlling means that occurs in a stated period is relatively great as compared with the amount of adjustment of the speed controlling means that occurs during the stated period when the speed of the engine varies only to a slight extent from the desired speed. Therefore, as the engine speed approaches the desired speed, the extent of adjustment of the speed controlling means during a stated period becomes progressively more gradual before the adjustment of the speed controlling means ceases altogether when the desired engine speed has been established, thereby minimizing the tendency of the engine to react excessively to the speed controlling means and not only have its speed corrected but also, by inertia, thrown out of adjustment in the opposite direction. This has been a serious defect in control apparatus of types heretofore used.

This invention is capable of many different embodiments and applications, but may be illustrated to advantage in connection with control of the operation of an airplane motor which is designed to operate at a substantially constant speed. With such an airplane motor the propeller pitch is varied to meet variations in the power output that are required to operate the airplane under different conditions of accelerating, decelerating, climbing, descending, etc., while maintaining the engine speed as nearly as possible constant. The invention of the present application is of particular utility in controlling the speed of an airplane engine by appropriate automatic adjustment of the pitch of the blades of the propeller.

It is a feature of the control apparatus of my invention that a movable member is provided and that the speed of movement of the movable member is determined by the extent of departure of the engine speed from a predetermined relationship between the engine speed and the frequency of a controlled frequency electric current. When a predetermined desired relationship between the speed of the engine and the current frequency is maintained, the movable member remains stationary, but when the engine speed varies from the predetermined relationship, then the movable member moves at a speed which increases depending upon the extent of the departure of the engine speed from the predetermined relationship. The control apparatus also includes a power supply device which comprises the said movable member and which supplies power to the motor for changing the propeller pitch in impulses, the total duration of a plurality of which differs at different speeds of the movable member. The individual impulses may be of the same duration but caused to increase in frequency, or may be of the same frequency but caused to be increased in duration, upon increase in the speed of the movable part. In either event the power supplied by the impulses may, and preferably does, increase until a continuous operation of the motor for changing the pitch of the propeller blades is effected. This occurs when there is a relatively great departure of the engine speed from the predetermined relationship between the engine speed and current frequency. For only slight departures of the engine speed from the predetermined relationship between the engine speed and the current frequency, the impulses which actuate the propeller blade pitch changing motor occur at intervals so that the change in the propeller pitch is effected more gradually. As aforesaid, the frequency of the power impulses or the duration thereof may differ at different speeds of the movable member so that in adjusting the propeller blade pitch the rate of adjustment becomes less and less as the desired engine speed is approached until it is discontinued altogether when the desired predetermined relationship between the engine speed and the frequency of the controlled frequency electric current is effected.

Preferably the apparatus is such that the individual power impulses are of a predetermined duration, and the frequency of the power impulses is varied depending upon the extent of departure of the engine speed from the desired predetermined relationship of the engine speed to the frequency of the controlled frequency current.

The propeller blade pitch changing motor may be an electric motor such as a reversible direct current motor. In such event the power impulses are in the form of impulses of electric current which cause the direct current motor to rotate in one direction or the other and to vary the pitch of the propeller blades in one direction or the other. Alternatively the propeller blade pitch changing motor may be hydraulically operated. At the present time the motor means generally used for changing the pitch of airplane propeller blades is operated either by electric power or by hydraulic power. When a hydraulic pitch changing motor is employed, the hydraulic power may be controlled, however, by electric current impulses which actuate valve means that control the hydraulic power supplied to the hydraulic pitch changing motor.

The movable member which is actuated when the engine speed departs from the desired engine speed is ordinarily actuated in one direction when the engine speed is above the desired speed and in the opposite direction when the engine speed is below the desired engine speed. Responsive to the direction of movement of the movable member, a selective reversing device is employed which controls the direction of operation of the propeller blade pitch changing motor.

There are many devices for producing an electric current of controlled frequency. In the embodiments described below or shown in the drawings, a direct current motor which operates at constant speed is used and operates an alternator at constant speed thereby setting up a constant frequency alternating current. It is to be understood, however, that this has been done merely for exemplification, that other devices for producing currents of controlled frequency may be used. For example, a vacuum tube oscillator of any of the well known types may be used either singly or in combination or with or without piezo-electric stabilization or with or without magnetostriction stabilization. Alternatively a gas discharge oscillator (e. g., a neon tube with suitable devices to secure symmetrical wave form) may be used or a dynatron oscillator or a grid glow tube (thyratron) oscillator or a vacuum tube with amplifier with tuning fork and/or microphone control (only when a single frequency is desired) or a mechanical vibrator driven from the direct current source or a chemical interrupter or the like. The number and kinds of known devices which can be used to produce a controlled frequency alternating current is great and it is largely optional which device is used as a source of constant frequency alternating current although the control of the frequency of the output should, of course, be as accurate as possible.

While my present invention is highly desirable for use in adjusting the blade pitch of a propeller driven by an airplane engine so as to maintain the engine operating at constant speed, it is apparent that the speed of other engines which drive a propeller may be similarly controlled. Moreover in addition to adjusting the pitch of propeller blades, the control apparatus may also be employed in controlling the action of other parts, movement of which results in varying the speed of an engine. Thus, in connection with various types of engines which may be internal combustion engines, steam engines, electric engines, etc., some part such as a throttle, load-varying device, or the like which effects the speed of the engine, may be moved by suitable motor means, the action of which is automatically governed by utilizing the control apparatus of the invention so as to maintain the engine speed constant or otherwise in a predetermined relationship to the frequency of a constant frequency electric current. Accordingly, it is the purpose of this invention to provide control apparatus suitable for controlling the speed of any type of engine. Having thus indicated in a general way the purpose and nature of the present invention, it will now be described in connection with certain illustrative embodiments which are described in order to afford a better understanding of this invention, but only for purposes of exemplification, the said illustrative embodiments being shown in the accompanying drawings wherein, Figure 1 is a schematic view of one type of control apparatus for use in connection with electric propeller pitch changing means;

Fig. 2 is a diagrammatic showing of a wiring arrangement suitable for controlling the speed of a plurality of engines by regulating the propeller blade pitch of the propellers driven by the respective engines so as to maintain the speed of the respective engines in a constant predetermined relationship to a single source of controlled frequency electric current;

Fig. 3 is a graphic showing on current-time coordinates showing the characteristics of the relay actuating current that occurs in the operation of the device shown in Fig. 1; and Fig. 3a is a graphic showing on current-time coordinates, showing the characteristics of a concurrent current impulse which is supplied to the pitch changing motor;

Fig. 4 is a graphic showing similar to Fig. 3 for frequent relay actuating current impulses; and Fig. 4a is a graphic showing similar to Fig. 3a of the concurrent current impulses transmitted to the pitch changing motor under such conditions;

Fig. 5 is a graphic showing similar to Fig. 3, of relay current actuating impulses of still greater frequency and Fig. 5a shows the effect of such current impulses in causing a continuous electric current to be transmitted to the pitch changing motor;

Fig. 6 is a schematic showing illustrating the use of the control apparatus for regulating the action of a hydraulic pitch changing motor;

Figure 1:
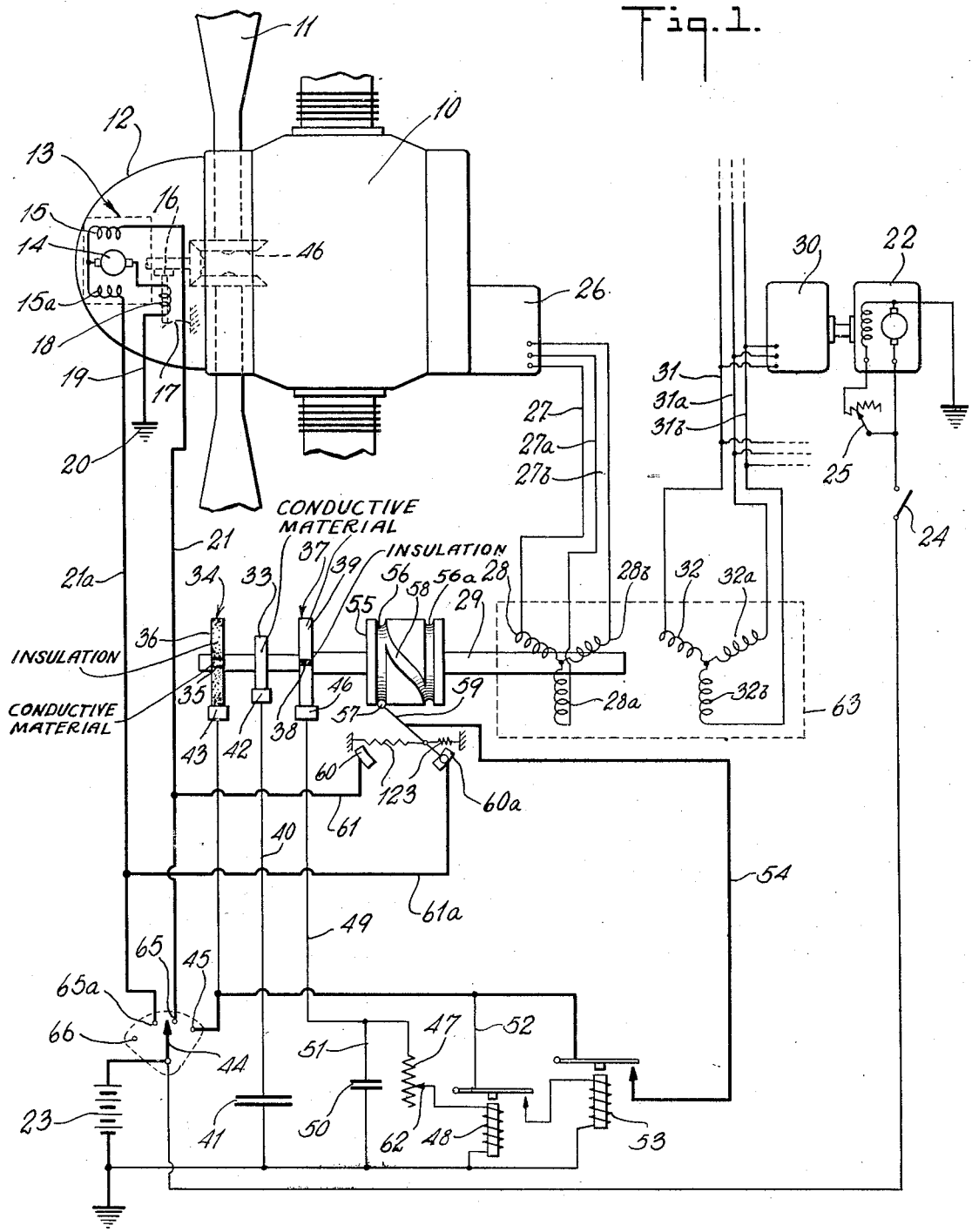

Fig. 7 is a schematic showing of an alternative power supply device for supplying power impulses to the pitch changing motor; and Fig. 8 is a schematic showing of an alternative device for causing movement of a movable member at a speed which is determined by the extent of departure of the engine speed from a predetermined relationship between the engine speed and the frequency of a controlled frequency electric current.

Referring to Fig. 1, the engine 10, which may be any suitable type of aviation engine, for example, drives a propeller 11. In the hub 12 of the propeller is a pitch changing motor which is indicated generally by the reference character 13. The pitch changing motor may be of any suitable type and may be, for example, a reversible direct current motor comprising an armature 14 and fields 15 and 15a. The motor 13 may be provided with a braking means which is indicated in the drawing as a retractable braking member 16, which is normally kept in braking position by a spring 17 and which can be retracted by the action of coil 18 whenever electrical current passes through line 19 leading from the ground 20 through the armature 14 of the motor. Lines 21 and 21a are adapted to energize the field 15 or the field 15a, as the case may be, as will be described hereinbelow. When the field 15 is energized the pitch changing motor will rotate in one direction while when the field 15a is energized the pitch changing motor will rotate in the opposite direction, and suitable means are provided (indicated diagrammatically in the drawings as gearing 46) for adjusting the pitch of the propeller blades in one direction or the other, depending upon the direction of rotation of the pitch changing motor.

For the purpose of producing a constant frequency electric current, a constant speed D. C. motor 22 operating an alternator is shown for purposes of exemplification. The constant speed D. C. motor is operated from a source of electric current which may, for example, be the battery 23. The line leading from the battery 23 to the motor 22 is controlled by a switch 24 and the speed of operation of the motor 22 may be controlled as by a variable resistance rheostat 25.

A suitable means for rotating a rotatable member in one direction or the other depending upon whether the engine speed is greater than or less than a predetermined relationship to the frequency of the constant frequency electric current and at a speed that increases as the extent of departure of the engine speed from said predetermined relationship increases, will now be described. Driven at a speed which is proportional to the speed of the engine is an alternating current generator 26, which may conveniently be the tachometer generator that is very commonly used in connection with an airplane engine in order to indicate the speed of the engine on the control board. Lines 27, 27a and 27b transmit a three-phase current generated by the generator 26 to windings 28, 28a and 28b which are mounted on a rotatable shaft 29 for rotation therewith and which constitute field producing means energized by a three-phase alternating current produced by the generator 26.

The alternator 30 which is driven by the constant speed motor 22 produces a three-phase alternating current, the frequency of which is maintained at a predetermined value suitable for controlling the speed of the engine. This frequency is the controlled frequency and can be maintained at any suitable value by adjustment of the rheostat 25. Current in lines 31, 31a and 31b energize stationary windings 32, 32a and 32b to produce a field which has a control frequency and which is in reactive relation to the field produced by windings 28, 28a and 28b. With the arrangement described, if the frequencies produced by generators 26 and 39 are identical, the shaft 29 will remain stationary. This condition is realized when the desired predetermined relationship occurs between speed of the engine and the frequency of the controlled frequency current produced by the generator 30. If, however, the frequency of the current produced by the generator 26 driven by the engine differs from the controlled frequency, then the shaft 29 will rotate in one direction or the other depending upon whether the engine speed is greater than or less than the engine speed which occurs when the engine speed and the frequency of the controlled frequency electric current are in the desired predetermined relationship. Moreover, the speed of rotation of the shaft 29 will be increased as the extent of deviation of the engine speed from the desired predetermined relation increases. The frequency in the field of the stationary windings 32, 32a and 32b may be termed a positional frequency, since it causes movement of and determines the position of the movable windings 28, 28a and 28b which are in reactive relationship with the said stationary windings.

The means for supplying power to the pitch changing motor, which means utilizes the rotary movement of shaft 29 and which supplies the power to the pitch changing motor in impulses so that the total duration of a plurality of impulses during a stated interval of time will be governed by the speed of rotation of the shaft 29, will now be described. Rotating with the shaft 29 is a slide contact member 33. Also rotating with the shaft 29 is an armature 34 which comprises a conductor segment 35 that is electrically connected with the slide contact member 33, the balance of the armature 34 being made of electrical insulating material 36. Another armature 37 also rotates with the shaft 29 and includes a segment 38 of electrical insulating material, the balance of the armature 37 being composed of electrical conductor material 39 that is electrically connected with the contact disc 33. The segments 35 and 38 are of substantially the same radial arc and are disposed in substantially the same radial rotational position with reference to the shaft 29. The line 40 leads from the brush 42 which contacts the contact disc 33 to the condenser 41, which condenser can be caused to become charged from the battery 23 whenever the brush 43 comes in contact with the contact segment 35 of the armature 34. In this circuit there is a switch 44 which, when brought in contact with the contact 45, completes the circuit so that the condenser 41 may become charged every time the armature 34 makes a complete revolution. More generally, it may be mentioned at this point that when the switch 44 is caused to be in contact with the contact 45 the automatic regulating device is in operation.

After the condenser 41 has been charged by the brush 43 coming in contact with the contact segment 35, the condenser 41 is discharged upon the brush 46 coming in contact with the conductor portion 39 of the armature 37. It is to be noted that the brush 46 leaves the insulating segment 38 of the armature 37 substantially immediately after the brush 43 leaves the contact segment 35 of the armature 34. The condenser 41 therefore is discharged by line 49 through the resistance 47 and through the sensitive relay 48. The resistance 47 causes the current that is set up upon the discharge of the condenser 41 to flow for a substantial interval of time with sufficient intensity to actuate the sensitive relay 48 for a substantial interval of time, as will be described more in detail hereinbelow. When the condenser 41 discharges through the line 49, a second condenser 50 in line 51 becomes instantly charged, but being of substantially smaller capacity than the condenser 41, the condenser 50, like the condenser 41, tends to discharge through the resistance 47 and the sensitive relay 48. The purpose of the smaller condenser 50 will be explained more in detail below.

The sensitive relay 48 controls a circuit 52 which operates the power relay 53 which controls the principal power circuit or line 54 through which the current for actuating the pitch changing motor flows. It is apparent that, whenever the sensitive relay 48 is actuated, current will flow in the circuit 54 so long as the sensitive relay 48 is energized.

The circuit 54 includes a selective or reversing switch which is arranged to control the direction of action of the pitch changing motor. Rotating with the shaft 29 is a cylindrical member 55 which has cam grooves 56 and 56a in the peripheral surface thereof in which cam grooves a follower 57 travels. Between the cam grooves 56 and 56a there is a diagonal cam groove 58. The follower 57 is carried by the pivoted arm 59 that by the action of balanced restoring springs 123 tends to move the follower 57 to the position midway between the cam grooves 56 and 56a. With this arrangement, if the shaft 29 is rotated in one direction, the follower 57 will always reach and remain in the cam groove 56; while, if the shaft 29 is rotated in the other direction, follower 57 will always reach and remain in the cam groove 56a. It is to be noted that the diagonal cam groove 58 is at substantially the same point of radial arc about the shaft 29 as the segments 35 and 38 of the armatures 34 and 37, so that whenever shaft 29 is rotated in one direction or the other to set up electrical impulses for actuating the pitch-changing motor, the pitch-changing motor will always be actuated in the proper direction through the action of the follower 57. The switch arm 59 being actuated by the follower 57 causes the circuit 54 to be completed either through contact 60 and line 61 or through contact 60a and line 61a, the line 61 being connected with the line 21 hereinabove described, and the line 61a being connected with line 21a hereinabove described, which lines lead to the pitch-changing motor and which govern the direction of operation of the pitch-changing motor.

A typical operation of the device of the character shown in Fig. 1 will now be described. So long as the speed of the engine is in the proper predetermined relationship to the frequency of the constant frequency electric current, the shaft 29 is not rotated and the power-supplying device for actuating the pitch-changing motor does not function to change the pitch of the propeller blades which are maintained in position by the braking member 16. If, however, the speed of the engine varies so as to be greater than or less than the speed required for maintaining the predetermined relationship between the engine speed and the frequency of the controlled frequency electric current, then the shaft 29 will rotate in one direction or the other and at a speed which varies as the extent of departure of the engine speed from the predetermined relationship increases. Assuming that the extent of departure of the engine speed from the predetermined relationship to the frequency of the constant frequency electric current is only slight, then the shaft 29 will begin to rotate slowly. As soon as the brush 43 reaches the contact segment 35 of the armature 34, the condenser 41 is charged. As the shaft continues to rotate through a slightly further angular extent, the brush 43 leaves the segment 35, and the brush 46 leaves the insulating segment 38 of the armature 37 and causes the condenser 41 to discharge through the resistance 47 and the sensitive relay 48. The character of the current through the sensitive relay 48 is indicated graphically on Fig. 3 in connection with the current-time coordinates which are indicated respectively by the letters I and T. It is seen that the current takes a substantial amount of time to discharge through the resistance 47, namely, while dropping from the original current intensity $I_0$ to zero. The sensitive relay requires a predetermined given minimum amount of current $I_r$ to be actuated and suitable relays of given degrees of sensitivity are well known. If the initial current intensity is $I_0$, it is seen that there is a definite interval of time $t$ during which the current flowing through the resistance 47 and the relay 48 drops from $I_0$ to $I_r$. During this interval of time, the relay 48 is closed and by action of this relay, together with the relay 53, power is transmitted to the pitch-changing motor through the line 54. However, as soon as the relay actuating current falls below $I_r$, the relay 48 is opened and the current impulse in the line 54 is dis-established. It is therefore seen that for a given circuit containing a condenser that is discharged through a resistance, the time of actuation of the relay 48 as well as the time of the resulting current impulse in line 54 is always the same, and may, for example, be desirably one-quarter of a second.

The characteristic of the current impulse in the line 54 is indicated graphically on the current time coordinates I and T in Fig. 3A. In this case, it is seen that the current is constant and of the desired intensity for actuating the pitch-changing motor at desired rate and after the duration of the impulse for the time $t$, which is controlled as above described, the current falls off to zero until such time as another impulse of current in line 54 is created. The duration of the impulse $t$ can, of course, be varied by changing the relative characteristics of the condenser 41 and of the resistance 47. In this regard, it is usually easier to control the value of resistance 47 than it is to vary the capacitance of the condenser. Accordingly, the resistance 47 is shown with a means 62 for varying the resistance in the condenser discharge circuit. By varying this resistance, the time $t$ during which the relay 48 is actuated and during which the current impulse flows in the line 54 may be adjusted as desired.

In Figs. 4 and 4A, the condition that occurs when impulses are produced somewhat more frequently by the faster rotation of shaft 29 is indicated. Thus, if the time $t$ is, for example, one-quarter second, Fig. 4 indicates the situation when the shaft 29 is rotating at the rate of one revolution every half second. In other words, condenser 41 is discharged every half second and actuates the sensitive relay 48 to produce a current impulse in line 54 of a one-quarter second duration, the frequency of the impulses, however, being every half second.

In Figs. 5 and 5a, the situation is indicated graphically as it occurs when the shaft 29 is rotating at a speed that is less than one-quarter of a second per revolution. It is seen that the current $I_0$ never has an opportunity to fall to the current value $I_r$ which is critical for the opening of the sensitive relay 48, due to the fact that the condenser 41 is charged and permitted to charge again before the discharge current can fall to $I_r$. The result, of course, is that the sensitive relay 48 under such conditions causes a continuous current to flow in the line 54 as indicated in Fig. 5A.

With the devices shown in Fig. 1, therefore, the effect is to produce current impulses such that the individual impulse is of predetermined duration and such that the frequency of the current impulses varies at different speeds of rotation of the shaft 29. The frequency varies from the extreme of no current impulses, on the one hand, to continuous current flow, on the other hand. While a current which is produced in the line 54 is continuous under certain circumstances, nevertheless for the purposes of convenience in description, it is to be understood in the specification and in the claims that, when reference is made to a current having impulses, the current may vary from zero through a region of spaced impulses, and in addition include a condition which occurs when a continuous current is set up because of the rapidity of successive action of the power-supplying device.

In the foregoing description, the function of the condenser 50 has not been referred to. Where the condition is of the character shown in Figs. 3 and 4, namely, when the shaft 29 is rotating so slowly that the current impulses are substantially spaced from each other, the condenser 50 does not serve a useful purpose inasmuch as this condenser discharges through the resistance 47 and the relay 48 along with the condenser 41 until the current intensity in the relay 48 is below $I_r$ before the condenser 41 is charged again. However, when the apparatus is being operated so that the shaft 29 rotates rapidly so as to produce the condition indicated in Fig. 5, it will be noted that the brush 46 will contact insulating segment 38 of the armature 37 before the current $I_0$ has dropped to the value $I_r$, and this would momentarily tend to trip the sensitive relay 48 as the brush 46 passes over the insulating segment 38. This would momentarily affect the current in the line 54 and might result in undue arcing of the pitch-changing motor. This difficulty is overcome by the inclusion in the apparatus of the small condenser 50, which continues to discharge through the resistance 47 and the sensitive relay 48 during the period of contact of the brush 46 with the insulating segment 38. Due to the fact that the condenser 50 only comes into play when the shaft 29 is rotating relatively rapidly, the period of contact of the brush 46 with the insulating segment 38 is only momentary, and for this reason the condenser 50, even though relatively small, will be sufficient to produce a current through the relay 48 for the interval of time necessary to preevnt the relay 48 from being tripped and from causing momentary breaks in the current in line 54 during the period when continuous operation of the pitch-changing motor is deemed desirable. The small condenser 50 is not, however, essential to the apparatus and the apparatus will operate satisfactorily without this small condenser in addition to the principal condenser 41.

The sensitivity and manner of operation of the device above described may, of course, be varied in several ways, as by introducing a step-up or step-down speed changing device between the rotatably mounted coils 28, 28a and 28b and the member 55 and associated armatures 34 and 37. Similarly, the frequency of the current generated by the generator 26 with reference to the engine speed may be varied by a variety of means. Also the segments 35 and 38 in armatures 34 and 37 may be duplicated one or more times with corresponding duplication of the diagonal cam groove 56 of the member 55.

As has been mentioned above, the control apparatus is in position for automatic operation when the switch 44 is in contact with the contact terminal 45. It is to be noted, however, that the lines 21 and 21a are connected respectively to contact terminals 65 and 65a so that by moving the switch 44 to one or the other of these contact terminals the pitch-changing motor can be operated in one direction or the other by manual operation of the switch 44. The switch 44 also has an off position 66 which cuts out the supply of power to the pitch-changing motor altogether.

In Fig. 2 there is a diagrammatic showing of a wiring arrangement suitable for controlling the speed of a plurality of engines which may, for example, be engines on a multi-engined aircraft. In Fig. 2 the constant frequency electric current is set up by the constant speed direct current motor 22 actuating the alternator 30. The constant speed electric motor 22 can be shut off by the shut-off switch 24 and its speed of operation controlled by the variable resistance rheostat 25 as has already been described. The constant frequency current produced by the generator 30 is carried by lines 31, 31a and 31b to the device 63 for producing rotation of a rotatable part in a direction which depends upon whether the engine speed is greater than or less than the predetermined relationship with the frequency of the controlled frequency electric current and at a speed which increases as the extent of departure of the engine speed from the predetermined relationship increases. The engine 10, of course, drives the propeller 11 and the tachometer generator 26, or the equivalent, actuated by the engine is connected to the device 62 by the lines 27, 27a and 27b. The pitch-changing motor 13 which is indicated diagrammatically in the hub 12 of the propeller 11 has the lines 21 and 21a leading thereto and is connected to the ground 20 as has previously been described. The armature, condenser and relay means of the power-supply device may be housed in the housing 64 indicated in Fig. 2. The switch 44 above described controls the automatic or manual operation of the pitch-changing motor in the propeller hub in the manner above described. While the wiring for one pitch-changing motor for the propeller driven by one of the engines 10 has been shown, the same wiring arrangement can be used for each of the other engines 10 and therefore has not been shown in connection with the other engines. It is, therefore, apparent that all that is required for controlling the speed of the engines of a multi-engined aircraft is a single source of controlled frequency electric current for all of the engines, and a relatively small unit for each engine as indicated by the reference characters 63 and 64 in Fig. 2 which can be connected by suitable wiring to the engine tachometer generator and to the pitch-changing motor. There would ordinarily be available for use by the operator the rheostat 25 which adjusts the frequency of the constant frequency electric current and by which the engine speed can be governed as desired. The switch 24 shuts off the operation of the source of the constant frequency electric current when the plane is not in use. The switches 44 determine whether the individual propeller pitch-changing motors are to be automatically controlled or are to be controlled manually by the operator as is frequently desirable in manipulating an airplane while on the ground.

In Fig. 6 means are indicated diagrammatically which may be used for actuating a hydraulic pitch-changing motor. There are several types of hydraulic pitch-changing motors which are known and for this reason no attempt has been made to show a particular construction of a hydraulic pitch-changing motor. In some types of hydraulic pitch-changing motor, the motor is reversible, depending upon whether a pressure differential is established in one direction or another through the motor. Means for controlling a hydraulic motor of such type is shown for convenience in illustration in Fig. 6. Thus, by way of exemplification, the line 67 may be a hydraulic line communicating with an oil supply maintained under a pressure of 200 pounds per square inch. Line 68 may be in communication with an oil supply maintained under a higher pressure, for example, 400 pounds per square inch. The line 69 may be in communication with a zone at atmospheric pressure. The valve 70 may be any suitable type of shut-off valve which normally shuts off communication between line 71 and both of the lines 68 and 69. In such case the hydraulic motor is maintained stationary and the pitch of the propeller blades remain unchanged. By energizing the solenoid 72 the lines 68 and 71 are placed in communication so as to create a pressure differential of 200 pounds between lines 71 and 67 in one direction, thereby causing the pitch-changing motor to adjust the pitch of the propeller blades in one direction. When, however, the solenoid 73 is energized then the valve 70 places lines 69 and 71 in communication so that there is a pressure differential of 200 pounds in the opposite direction established between the lines 67 and 71, thereby causing the pitch-changing motor to adjust the pitch of the propeller blades in the opposite direction. The solenoids 72 and 73 are actuated by current in the lines 21 and 21a of the device shown in Fig. 1 and are in parallel relation with respect to the ground 20. The solenoids 72 and 73, therefore, correspond to the coils 15 and 15a of the pitch-changing motor shown in Fig. 1. However, in the device shown in Fig. 6, the pulsations of current in the lines 21 or 21a actuate the valve 70 so as to create impulses of hydraulic pressure which actuate the hydraulic pitch-changing motor that adjusts the pitch of the propeller 74. As previously described, the action is proportional, namely, during a stated interval of time the adjustment of the propeller blade pitch is greater when the engine speed has considerably deviated from its desired predetermined relationship to the frequency of the controlled frequency electric current but is less during a stated interval of time (due to the infrequency of the current impulses) when the engine speed differs only slightly from the desired predetermined relationship to the frequency of the controlled frequency electric current.

In the device above described, the individual power impulses supplied to the pitch-changing motor (either hydraulic or electric) are of the same length until a constant supply of power is attained, and total power supplied for a stated interval of time is varied by varying the frequency of the power impulses. The apparatus according to this invention may also be made to act proportionally by varying the length of the individual power impulses while having the frequency of the power impulses remain the same, the power impulses becoming of greater length when the extent of departure of the engine speed from the predetermined relationship to the frequency of the controlled frequency electric current is increased. A control apparatus of this latter type is shown in Fig. 7.

Referring to Fig. 7, the lines 21 and 21a lead to means for actuating either an electric or a hydraulic propeller blade pitch-changing motor, e. g., as described in connection with Figs. 1 or 6. The lines 27, 27a, and 27b are connected to the tachometer generator of the engine in the manner described above in connection with Fig. 1 and the frequency of the current therein will vary with variations in the speed of the engine as has been described above. The three-phase current in the lines 27, 27a and 27b energizes the coils 28, 28a and 28b, which rotate with rotatable shaft 75. The lines 76 and 76a lead to a source of constant frequency electric current which may be an alternator driven by a constant speed D. C. motor as described in Fig. 1 or which may be any other suitable source of controlled frequency electric current. The current in lines 76 and 76a energizes the coil 77 which is in reactive relation to the field produced by energizing coils 28, 28a and 28b. While the current in the lines 76 and 76a is indicated as ordinary single-phase alternating current, the unit indicated generally by the reference character 78 acts in the manner hereinabove described for the production of rotation of shaft 75 in one direction or the other depending upon whether the speed of the engine is greater than or less than the predetermined relationship between the engine speed and the frequency of the controlled frequency electric current and at a rate which increases as the extent of departure of the engine speed from the predetermined relationship increases. Alternatively other arrangements are also possible, e. g., the winding 77 may be mounted on the rotatable shaft 75, the windings 28, 28a and 28b being stationary, or the generator may generate a three-phase alternating current and be connected to windings similar to the windings 32, 32a and 32b shown in Fig. 1, etc., as may be convenient in effecting the desired action of shaft 75 or equivalent movable member.

The power supply means for producing pulsations of power of different duration depending upon the speed of rotation of the shaft 75 will now be described. Actuated by rotation of the shaft 75 is a direct current generator 79 which produces direct current flowing in one direction or the other depending on the direction of rotation of the shaft 75 and of an intensity which varies depending upon the speed of rotation of the shaft 75. The relays 81, 82 and 83 are connected in parallel in the line 80 which takes off the direct current generated by the direct current generator 79. The relays 81, 82 and 83 are of different sensitivity, the relay 81 being the most sensitive and the relay 83 being the least sensitive. Upon slight rotation of the shaft 75 a slight current in the line 80 is generated which is sufficient, however, to actuate the relay 81 but is insufficient to actuate either of the relays 82 or 83. The actuation of the relay 81 results in actuation of the power relay 84 which is arranged in an appropriate circuit and controls the main power line that communicates with the pitch-changing motor through lines 21 and 21a.

In order to produce pulsations, a so-called pulsing drum 85 is used which is continuously rotated by any suitable source of power (not shown) such as the constant speed D. C. motor used in setting up the controlled frequency electric current, or by the engine itself. The drum 85 carries armature 86 which contains insulating segments 87 and conductor segments 88 that are in electrical connection with the contact disc 89. Therefore, when the sensitive relay 81 only is actuated, only the power relay 84 is actuated, and the current will flow from the electric current source 90 through the switch 91 and line 92 to the contact disc 89 and thence through the armature 86 which carries the spaced conductor segments 88 and which, because of the rotation thereof, causes the current to flow intermittently through the line 93 and relay 84 to either one of the lines 21 or 21a.

In order to selectively control which of the lines 21 or 21a is to be energized with electric current depending upon the direction of rotation of the shaft 75, a reversing switch is used that is responsive to the direction of the current produced by the direct current generator 79. In the power line 120 is a relay 94 controlling flow of current to line 21 and another relay 94a controlling flow of current to line 21a. The actuation of relays 94 and 94a is accomplished by a polarized switch 95 which completes a circuit including line 121 and ground 122 and said relays are arranged in parallel so that said switch actuates one or the other of these relays depending upon the direction of current flow from the D. C. generator 79 through the coil 96 forming part of the polarized switch 95. It is, therefore, apparent that the direction of actuation of the direct current generator 79 controls the direction of actuation of the motor means for adjusting the pitch of the propeller blades and that the intensity of the current generated by the D. C. generator 79 governs the action of the relay means which controls the power circuit through the pulsing drum 85.

If the D. C. generator operates somewhat more rapidly so as to produce a current of sufficient intensity to actuate relay 82 in addition to relay 81, then the power relay 97 will be actuated in addition to relay 84. In this case the power circuit will be completed through the armature 98 which rotates with the pulsing drum and which contains the insulating segments 99 and the conductor segments 100 which latter are in electric communication with the contact disc 89. It is to be noted that the conductor segments 100 are of greater radial arc about the armature 98 than the radial arc of the conductor segments 88 about the armature 86. Therefore, for a given speed of rotation of the pulsing drum 85, the individual power impulses that are caused to occur when the power relay 97 is actuated are of greater duration than when the power relay 84 alone is actuated.

If the engine speed is still further out of adjustment and the speed of rotation of the shaft 75 has increased to sufficient extent, the current generated by the generator 79 will actuate the relay 83 which controls the action of the power relay 101. This relay 101 short circuits the pulsing drum 85 altogether and permits a continuous supply of electric current to flow through one or the other of the lines 21 and 21a leading to the pitch-changing motor depending on the position of the selective reversing switch 95.

As in the previous embodiment, a control switch 91 for the entire apparatus is conveniently used. When the switch 91 is on the contact terminal 102, the device is set for automatic operation. By moving the switch 91 to one or the other of contact terminals 103 or 103a connected respectively to lines 21 and 21a, the pitch-changing motor can be operated in one direction or the other under manual control of the operator. The off position of the switch is indicated by the reference character 104.

It is apparent that a device of the type shown in Fig. 7 can be made of varied sensitivity by increasing or decreasing the number of relays of different sensitivity that are used and the number of armatures that rotate with the pulsing drum. Also by making the armature 98 with conductor segments 100 of the same extent or arc as segments 88 on armature 86 but of greater total number, individual impulses of the same length as those caused by armature 85, but of increased frequency, can be produced. Variation in sensitivity can also be controlled by varying the speed of rotation of pulsing drum 85 and the number and extent of the insulator and conductor segments thereon. Variation in sensitivity may also be effected by introducing a step-up or step-down power transmission device between the shaft 75 and the generator 79 and in other ways. It is also apparent that the device shown in Fig. 7 may be used in operating any number of engines from a single source of controlled frequency electric current. Thus, the lines 76 and 76a may be continued to another engine and the lines 92, 93 and 105 leading to the pulsing drum may have branch lines connected thereto in communication with other power supply devices so that the single pulsing drum can be used for control of a plurality of engines.

In Fig. 8 an alternative device is shown for producing the rotation of a rotatable member in different directions depending upon whether the speed of the engine is greater than or less than a predetermined relationship of engine speed to the frequency of the controlled frequency electric current. In Fig. 8 the shaft 106 is rotated by any suitable means not shown at a speed which varies with variation in speed of the engine. For example, the shaft 106 may be driven from the engine by some direct mechanical drive means with or without gearing interposed which either steps up or steps down the speed of the shaft 106 with reference to the engine speed or from a tachometer or the like by using a synchronous motor to actuate the shaft 106. The shaft 106 carries an armature 107 which may be in the form of a permanent magnet or which may be energized by coils 108 carried thereby as shown in the drawing. The coils 108 are maintained in connection with a suitable source of current such as the battery 109 by slip rings 110. Current in the lines 111 leading to the brushes for the slip rings is controlled by the switch 112. The switch 112 also controls the line 113 which energizes the coils 114 on the relatively rotatable stator 119 through the slip rings 115 from the source 116 of controlled frequency electric current. The relatively rotatable stator 119 may be carried by the rotatable shaft 117, that is rotationally mounted in the support bearing 118. When the switch 112 is closed it is apparent that the armature 107 will be energized so as to have a field having a positional frequency that varies depending upon variations in speed of the engine. The relatively rotatable stator 119 is energized with a field, the frequency of which is controlled by the source 116 of controlled frequency electric current. When the fields of coils 108 and 114 have the same frequency, then the relatively rotatable stator will remain stationary. This condition will be maintained when the engine speed is in the desired predetermined relationship to the frequency of the controlled frequency electric current. When, however, the engine speed becomes greater than or less than the desired engine speed, then the rotatable stator will be rotated in one direction or the other and at a speed which increases as the extent of departure of engine speed from the predetermined relationship to the frequency of the controlled frequency electric current increases. In other words, the shaft 117 behaves similarly to the shaft 75 in Fig. 1 and to the shaft 29 in Fig. 7. Therefore, the device shown in Fig. 8 may be used to actuate the armature arrangement shown in Fig. 1 or the reversible direct current motor 79 in Fig. 7.

It is apparent that other variations may be made in control apparatus embodying this invention. Thus, for example, the selective reversing switch arrangement shown in Fig. 1 may be employed in connection with the device shown in Fig. 7. Conversely, the polarized relay reversing switch shown in Fig. 7 may be used in the device shown in Fig. 1 and in such case a small D. C. current generator would be substituted for the cylindrical member 55 shown in Fig. 1. In the drawings, grounds have been shown for purposes of simplicity but obviously the grounds may be omitted and wiring to complete the circuits provided. The motors 13 and 22 may be shunt or series wound as desired. Ordinarily the alternators 26 and 30 and generator 79 are provided with a permanent magnet field means but this is not essential. In connection with the embodiment shown in Fig. 7 a device (not shown) to cut out the line leading from the generator 79 may be provided to prevent damage to the rest of the apparatus under abnormal conditions. Also instead of the mechanical relay means shown in Figs. 1 and 6 other equivalent relay means may be used, e. g., thermionic tubes such as thyratrons.

It is also apparent the control apparatus of the invention may be utilized to maintain the speeds of a plurality of engines synchronized, utilizing one of the engines as the master or control engine. Thus, for example, the alternator 30 instead of being actuated by a constant speed D. C. motor as shown in Fig. 1 may be a tachometer generator or the equivalent of the character of generator 26 that is actuated by the engine. In such case the engine used as the master or control engine would govern the speed of the other engine or any number of other engines in the ways that have been illustrated hereinabove.

As aforesaid control apparatus according to this invention may be incorporated in many different embodiments and use of various circuit means, relay means, pulsing means, etc., may be within the inventive concept of the invention and it is to be understood that the embodiments of this invention that have been specifically described and shown in the drawings are merely exemplary of this invention, the scope of which is defined by the language of the following claims.

I claim:

1. Control system component for controlling the speed of an engine and comprising output terminals adapted for connection to an engine control motor circuit, said control system component comprising means for generating a first electric current having a controlled frequency, means for generating a second electric current the frequency of which varies with variation in speed of the engine, a rotatable member, means including field means actuated by a difference in frequency between said first and second electric currents for rotating said rotatable member at a speed that increases upon increased departures in either direction of the frequency of said second electric current as determined by the speed of said engine from a predetermined relationship between the frequencies of said first and second electric currents, and in either of opposite directions depending upon whether the frequency of said second electric current is greater than or less than the frequency of said predetermined relationship and for maintaining said rotatable member stationary when the frequencies of said first and second electric currents are in said predetermined relationship, a power supply circuit for supplying electrical energy to said output terminals, a reversing switch in said power supply circuit actuatable by rotation of said rotatable member to selectively supply electrical energy to one of said output terminals when said rotatable member is rotated in one direction and to another of said output terminals when said rotatable member is rotated in the opposite direction for selectively energizing said control motor circuit in opposite directions, relay means for controlling said power supply circuit, a relay actuating circuit for actuating said relay means to supply power to said output terminals in impulses of predetermined duration and of a frequency that increases as the speed of rotation of said rotatable member increases, said relay actuating circuit including a second relay means, condenser means and resistance means connected in series with said second relay means, and make and break contacts actuatable by said rotatable member to complete said relay actuating circuit for discharge of said condenser means to actuate said relay means to complete the circuit to appropriate output terminals at intervals the frequency of which is determined by the speed of rotation of said rotatable member and to thereafter break said relay actuating circuit, and a condenser charging circuit for charging said condenser means, said condenser charging circuit including a source of electric energy and make and break contacts actuatable by rotation of said rotatable member to complete said condenser charging circuit for charging said condenser means while said relay actuating circuit is broken and to break said condenser charging circuit when said relay actuating circuit is completed for the discharge of said condenser means to actuate said relay means.

2. Control system component according to claim 1 wherein said condenser means in said relay actuating circuit constitutes the primary condenser means of the said relay actuating circuit and wherein said relay actuating circuit includes secondary condenser means which is of less capacity than said primary condenser means and which is shunted across said relay means and said resistance in said relay actuating circuit so as to continue the actuation of the relay means for a predetermined interval after said relay actuating circuit has been broken by said make and break contacts therein.

3. Control system component for controlling the speed of an engine, and comprising output terminals adapted for connection to an engine control motor circuit, said control system component comprising means for generating a first electric current having a controlled frequency, means for generating a second electric current the frequency of which varies with variation in speed of the engine, a rotatable member, means including field means actuated by a difference in frequency between said electric currents for rotating said rotatable member at a speed that increases as the extent of departure from a predetermined relationship between said engine speed and said controlled frequency electric current frequency increases, and in either of opposite directions depending upon whether said engine speed is greater or less than said predetermined relationship, and a power-supplying device including said rotatable member and an electrical circuit for supplying electric power in impulses of uniform time duration to the appropriate of said output terminals to change the speed of the engine in the required one of the opposite directions, the total duration per unit time of a plurality of which impulses differs at different speeds of said rotatable member, said circuit including a source of electrical energy, a power relay and a sensitive relay, one terminal of each of which is connected to one terminal of said source, a second terminal of said power relay being connected to a contact of said sensitive relay, a second terminal of said sensitive relay being connected to a variable resistance, the said variable resistance being connected to a stationary contact, a conductive disc rotatable with said rotatable member with which said last-named contact engages, said disc having a circuit interrupting portion of non-conductive material, a second conductive disc rotatable with said rotatable member, a contact engaging said last-named disc, a capacitative reactance connected to said last-named contact and to the first-named terminal of said power source, a disc of non-conductive material rotatable with said rotatable member, said disc having a conductive portion in electrical connection with said two first-named discs, a contact engaging said non-conductive disc and connected both to the second contact of the sensitive relay and a first contact of the power relay and to the other terminal of said power source, said circuit interrrupting portion on said first-named disc and said conductive portion on said third-named disc being radially aligned so that the respective contacts engaging the first and third-named discs engage the respective portions at the same time during rotation of said discs, and a reversing means connected to a second contact of said power relay for selectively connecting the power supplied from said energy source to the appropriate one of said output terminals in response to the direction of rotation of said rotatable member so as to energize that one of said output terminals appropriate to establish the said predetermined relationship between the speed of said engine and the frequency of said controlled frequency circuit.

CHARLES LUDWIG BAUMANN, Jr.